US005213532A

United States Patent [19]
Mee

[11] Patent Number: 5,213,532
[45] Date of Patent: May 25, 1993

[54] THREADED BORE ENGAGING, ORBITAL REPLACEMENT UNIT ELECTRICAL CONNECTOR ASSEMBLY

[75] Inventor: Francis H. A. Mee, Alliston, Canada

[73] Assignee: Canadian Space Agency/Agence Spatiale Canadienne, Montreal, Canada

[21] Appl. No.: 864,793

[22] Filed: Apr. 7, 1992

Related U.S. Application Data

[63] Continuation-in-part of Ser. No. 611,547, Oct. 25, 1990, Pat. No. 5,120,243.

[51] Int. Cl.⁵ .................................... H01R 13/627
[52] U.S. Cl. ................................. 439/364; 439/359
[58] Field of Search ............... 439/359, 361, 362, 364, 439/474, 478, 805, 247, 248, 348

[56] References Cited

U.S. PATENT DOCUMENTS

| | | | |
|---|---|---|---|
| 3,159,444 | 12/1964 | Stine, Jr. | 439/359 |
| 3,631,377 | 12/1971 | Ball | 439/348 |
| 3,732,525 | 5/1973 | Henschen et al. | 439/364 |
| 5,120,243 | 6/1992 | Mee | 439/364 |

FOREIGN PATENT DOCUMENTS 0721933  3/1980  U.S.S.R. .............. 439/359

Primary Examiner—Larry I. Schwartz
Assistant Examiner—Hien D. Vu
Attorney, Agent, or Firm—Francis W. Lemon

[57] ABSTRACT

An orbital replacement unit electrical connector assembly is provided which is releasably attachable to a threaded bore of a target area of a support structure having at leat one first electrical connector and nut mounted thereon. The orbital replacement unit includes a casing in which a base panel housing is mounted together with a threaded shaft for engagement with the nut. A spring loaded transfer mechanism is provided between the shaft and the base panel which has at least one second electrical connector for mating with the first electrical connector. The spring loaded transfer mechanism serves to apply a disconnecting load at the interface between the shaft and the base panel to align the threaded shaft with the nut. Rotation of the aligned threaded shaft causes a second load to be applied for aligning the second electrical connector with the first electrical connector as the threaded shaft is screwed into the nut. Further rotation of the threaded shaft screws the threaded shaft further into the nut which causes electrical connection between the first and second electrical connectors.

4 Claims, 4 Drawing Sheets

THREADED BORE ENGAGING, ORBITAL REPLACEMENT UNIT ELECTRICAL CONNECTOR ASSEMBLY This is a continuation-in-part of application Ser. No. 07/611,547, filed Oct. 25, 1990, now U.S. Pat. No. 5,120,243, dated Jun. 9, 1982.

This relates to a threaded bore engaging, orbital replacement unit, electrical connector assembly.

BACKGROUND OF THE INVENTION

Difficulties have been experienced in attempting to form an effective electrical connection between an orbital replacement unit (ORU) and its docking station.

Among the difficulties experienced are, i) proper alignment of the ORU with the docking station to effect electrical connection without jamming, and ii) easy disconnection of the mated electrical connectors.

When operating in a hostile environment such as outer space, it may be difficult to distinguish one ORU from another and as a result, there is always a risk that an incompatible ORU may be docked at a particular docking station and if electrical connections are made with the incompatible ORU, damage could result to the ORU and the system to which it is connected. There is a need for a connector system which will prevent the forming of an electrical connection between a docking station and an incompatible ORU.

There are, however, circumstances where it may be essential to maintain at least one electrical connection between any one docking station and an incompatible ORU and the connector system and so there is also a need to meet this requirement.

SUMMARY OF INVENTION

According to the present invention there is provided a threaded bore engaging, orbital replacement unit, electrical connector assembly, for mating with a docking station connector, comprising:

a) a base panel, b) at least one orbital replacement unit electrical connector mounted on the base panel, c) an open bottomed, base panel housing having the base panel held therein against relative rotation but slidable, therein downwardly from an upper portion of the housing interior for bringing the said at least one electrical connector into electrically conductive engagement with at least one electrical connector of the corresponding docking station, d) means for mounting the housing in an opening in a rear wall of an orbital replacement unit casing with the open bottom of the housing exposed for the said engagement of the electrical connectors, e) a tube attached at one end to the housing and at the other end to a front face of the casing to form an open ended passage extending through the casing to the base panel, f) a shaft mounted in the tube for relative longitudinal and rotational movement therebetween, the shaft extending through the base panel for relative rotation and longitudinal movement therebetween, the shaft terminating beyond the base panel with a leading screw threaded end for mating with the threaded bore of the docking station connector, and g) spring loading means spring loading the shaft to a retracted position and holding the base panel in the upper portion of the housing interior, whereby, with a corresponding docking station connectors positioned beneath the housing, i) the spring loading means will, when the shaft and base panel are moved forwardly for the leading end of the shaft to meet and be aligned with the threaded bore of the docking station connector, apply an initial disconnecting force urging the shaft and the base panel towards the retracted position, and then ii) rotational movement of the shaft will then cause threaded engagement between the screw threaded end of the shaft and the threaded bore of the docking station connector at which stage the spring loading means will apply a preload for accurate alignment of the electrical connectors of the connector assembly and the docking station, and then iii) further rotation of the shaft causes further threaded engagement between the screw threaded end of the shaft and the nut which brings the aligned electrical connectors into electrical connection.

The screw threaded leading end of the shaft may terminate with a rounded nub for guiding the leading end of the shaft into the threaded bore of the docking connector.

A releasing collar may be provided on the shaft for engagement with the base panel for positive displacement of the mated connectors during disconnection.

The connector assembly may also comprise a second annular stop attached to the inside of the tube and extending around the shaft, a flanged sleeve is slidably mounted around the shaft in a leading portion of the tube with the flange for abutment with the annular stop, the base panel is attached to a leading end of the flanged sleeve, a spring retaining ring is attached to the tube leading end and is around the shaft, a compression spring, for applying the disconnecting load is compressed between the sleeve flange and the spring retaining ring, a shaft collar is attached to extend around a portion of the shaft rearwardly of the annular stop, and a compression spring for applying the preload is compressed between the annular stop and the shaft collar to hold the sleeve flange against the annular stop.

BRIEF DESCRIPTION OF THE DRAWINGS

In the accompanying drawings which illustrate, by way of example and embodiment of the present invention.

DESCRIPTION OF THE PREFERRED EMBODIMENT

Figure 1:
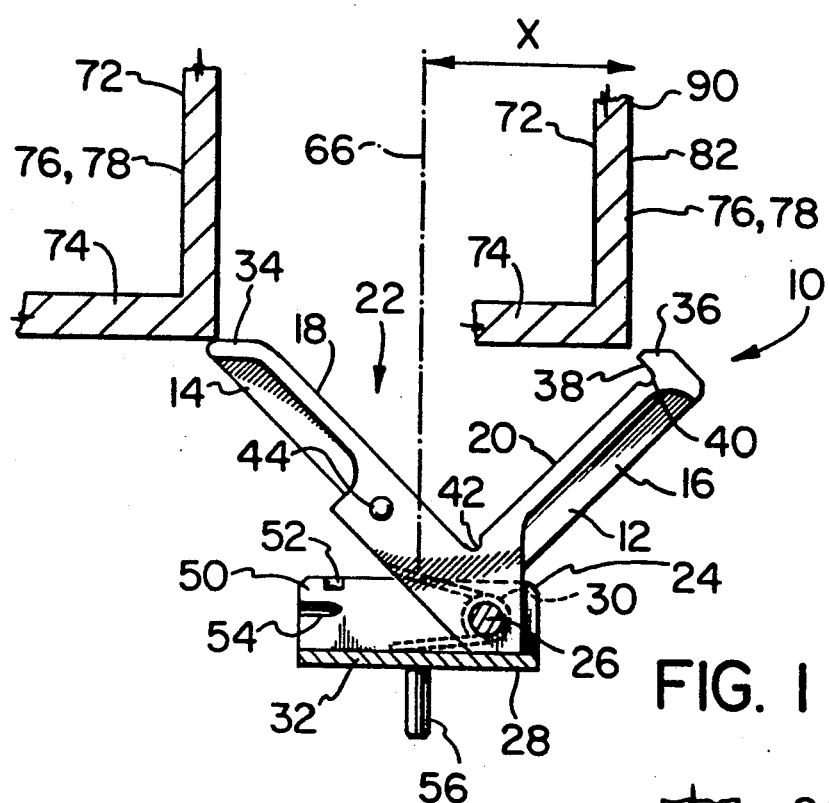
FIG. 1 is a partly sectioned side view of an alignment lever for use with a threaded bore engaging, orbital replacement unit connector shown in FIGS. 6 to 8.
Figure 2:
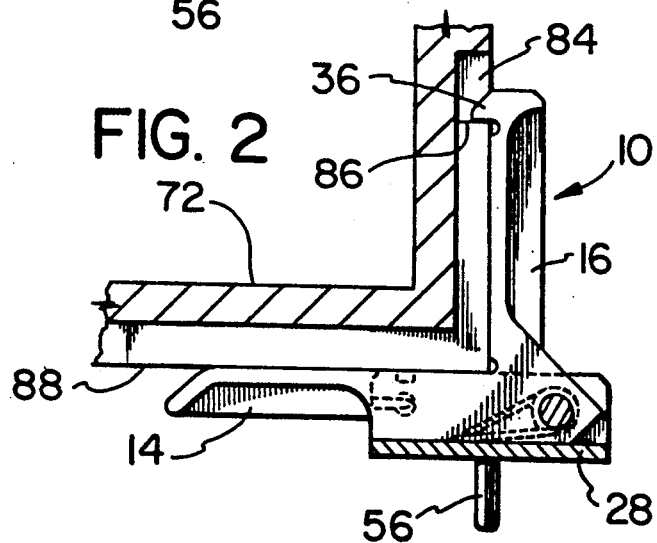
FIG. 2 is a partly sectioned side view similar to FIG. 1 showing the lever in a second position.
Figure 3:
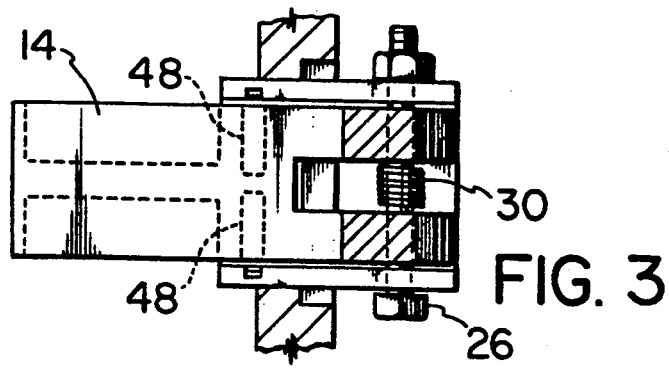
FIG. 3 is a plan view of the lever of FIG. 2.

With reference to FIGS. 1 to 3 of the drawings, the reference numeral 10 refers generally to an alignment lever constructed for use with a threaded bore engaging, orbital replacement unit electrical connector assembly in accordance with the present invention.

The alignment lever has a body 12 which has a bottom arm 14 and a side arm 16. The bottom face 18 is formed on the bottom arm 14 and a side face 20 is formed on the side arm 16. The bottom face 18 and side face 20 cooperate with one another to form a V-shaped alignment seat 22. A corner portion 24 projects outwardly from the junction of the proximal ends of the arms 14 and 16. Pivot pin 26 serves to pivotally connect the body 12 to a base 28. A spring 30 is mounted on the pivot pin 26 and has one end bearing against the outer face of the bottom arm 14 and another end bearing against the base plate 32 of the base 28. The spring 30 acts as a biasing means that normally urges the body 14 to pivot to the first position shown in FIG. 1 of the drawings.

The bottom are 14 has an end face 34 at the distal end thereof which is inclined at an angle with respect to the bottom face 18 so as to extend generally parallel to the base plate 32 such that it is horizontally disposed when the lever arm is in the first position. A load retaining finger 36 is located at the distal end of the side arm 16 and has an inner face 38 which overlies a portion of the bottom face 18. Clearance notches 40 and 42 are provided at opposite ends of the side face 20 to accommodate minor irregularities in the structure of the orbital replacement unit.

A pair of detent balls 44 are mounted in passages 48 formed at opposite sides of the bottom arm 14 and are normally urged outwardly by means of compression springs located in the passages 48.

The base has a pair of oppositely disposed side walls 50 that extend upwardly from the base plate 32. An inclined ramp 52 is formed at the upper edge of the inner face of each side wall 52. A V-shaped groove seat 54 is formed on the inner face of each side wall 50. The ramp 52 serves to gradually deflect the detent balls 44 inwardly as the lever is pivoted from the first, outwardly inclined position shown in FIG. 1 to the second, load accommodating position shown in FIG. 2. When in the second position shown in FIG. 2, the detents 44 are seated in the seats 54 and serve to releasably retain the lever 10 in the second position.

Figure 4:
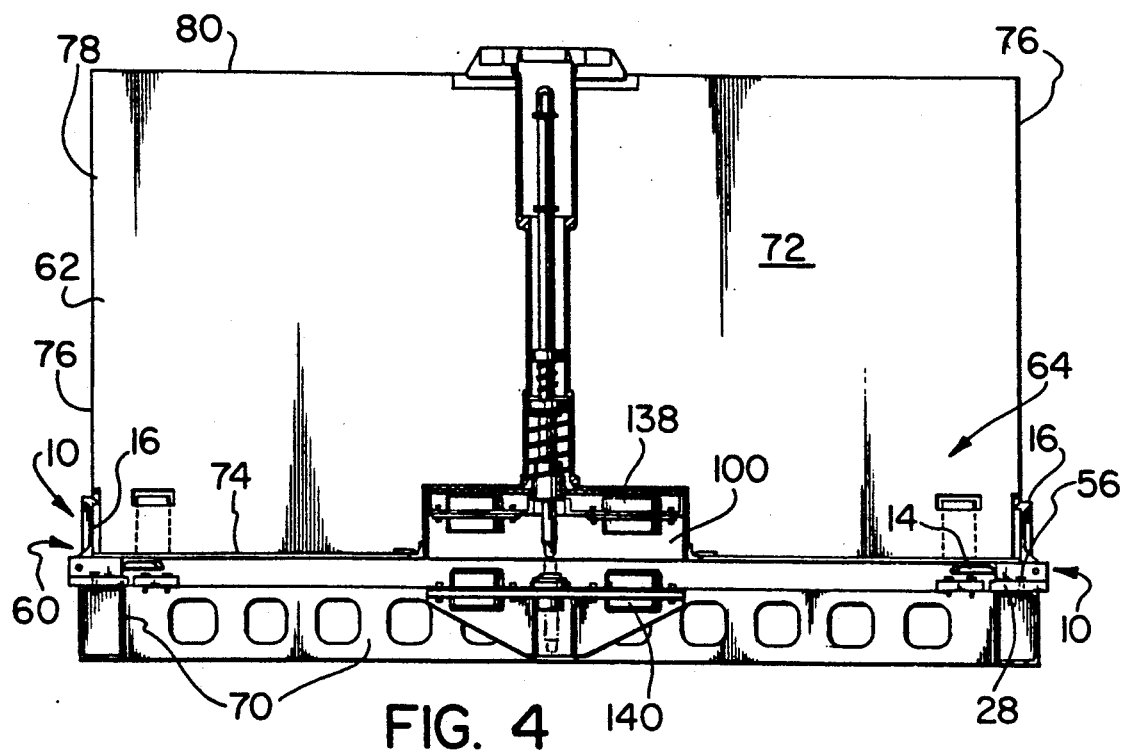
FIG. 4 is a partly sectioned side view showing an orbital replacement unit attached to the target area of an orbiter.
Figure 5:
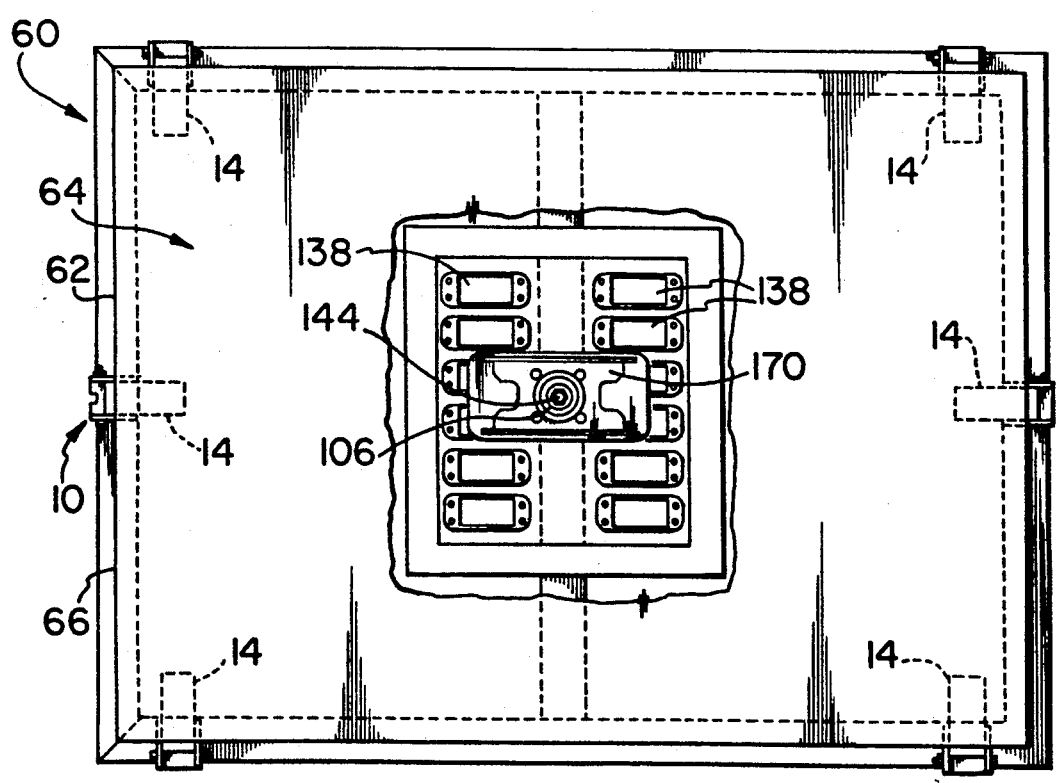
FIG. 5 is a plan view of the assembly of FIG. 4.

Mounting screws or rivets 56 are provided for securing each base 28 with respect to the support structure as illustrated in FIG. 4. With reference to FIGS. 4 and 5 of the drawings, an alignment assembly which is generally identified by the reference number 60 is provided for the purposes of aligning a load item such as the orbital replacement unit 62 with a target area generally identified by the reference numeral 64. A plurality of alignment levers 10 are located at spaced positions about the perimeter 66 of the target area with the bottom arms 14 arranged to project inwardly into the target area when the lever arms are in the second position.

As shown in FIG. 4, the base 28 of the alignment lever 10 is attached to the support structure 70 of a docking station, by means of the mounting screws or rivets 56.

The orbital replacement unit ORU 62 comprises a housing 72 which has a bottom wall 74 and oppositely disposed side walls 76 and 78 that extend upwardly from the bottom wall to a top wall 80.

Docking corners 82 (FIG. 1) are formed between the side walls 76, 78 and the bottom wall 74. A recess 84 is formed in the side walls 76, 78 at each of the docking corners to receive the load retaining finger 36. Each recess 84 has a bottom face 86 which is spaced from the bottom face 88 of the housing 72, a distance which is slightly less than the distance between the inner face 38 and the bottom face 18 of the lever so as to permit the lever to pivot from the second position to the first position as the orbital replacement unit is removed from the target area.

In use the biasing springs will serve to locate the alignment levers 10 in the first position shown in FIG. 1 prior to the docking of an orbital replacement unit. Consequently, all of the side arms 16 will project laterally outwardly from the perimeter 66 of the target area and will have the effect of enlarging the target area. In the position shown in FIG. 1 the alignment levers are spaced at 45° from the second position shown in FIG. 2.

In a typical installation the target area is enlarged by 2 x X where as shown in FIG. 1, X is the distance between the perimeter 66 and the outer reach 90, which is typically about 1½ inches.

In use as the housing 72 approaches the target area within the reach of the lever arms, first contact with the lever arms will be with the end face 34 of the lever arms located along one or more side edges of the perimeter. Further movement of the housing 72 towards the target area will cause the alignment lever to begin its movement towards the second position. As a result, the side lever arm 16 will begin to pivot toward the target area. If the housing 72 projects outwardly from the target area as shown in one arrangement in FIG. 1, the arm 16 will contact the side wall 76, 78 and will drive the housing 72 toward the position in which it is aligned with the perimeter 66 and is located in the position shown in FIG. 2 in which the load retaining fingers 36 extend into the recesses 84. It will be noted that the axis of the pivot pin 26 is spaced outwardly from the plan of the perimeter 66 with the result that the "reach" of the lever arm 16 is greater than that which would be achieved if the axis of the pin 26 was located in the plane of the perimeter 66.

From the foregoing, it will be apparent that the alignment levers will serve to provide an enlarged entry to the target area with the result that it is only necessary for an astronaut to initially align the ORU within the reach of the alignment levers in order to achieve the required alignment. This may serve to provide plus or minus 1.5 inches tolerance in the initial alignment requirements.

It will also be apparent that because the side arms 16 of each of the lever arms extend laterally outwardly from the perimeter 66, the lever arms will provide a visual cue to a robot operator or an EVA astronaut which will serve to indicate the direction in which adjustments must be made in order to locate the ORU within the reach of the docking area. In addition, if forceably moment sensing and accommodation is used for the purposes of docking, the alignment levers provide correct and unambiguous input to the operator and accommodation algorithms for enhancement and potential automated changeout. Furthermore, the correct positioning of the connector carriage is guaranteed and before the connectors are mated as will be described hereinafter.

To release the ORU from the docking station, it is merely necessary to pull it away from the docking station. The side arms 16 of the alignment levers will be deflected outwardly as a result of the initial contact between the bottom face 86 of the recesses 84 and the locking fingers 36 and will continue to be urged to move outwardly toward this first position by reason of the spring 30. The gap formed between the fingers 36 and the bottom face 86 is sufficient to ensure that the bottom arm 14 can pivot upwardly to a sufficient extent to permit continued movement of the alignment lever when the bottom face 86 makes contact with the fingers 36.

ATTACHMENT OF ORBITAL REPLACEMENT UNIT

Figure 6:
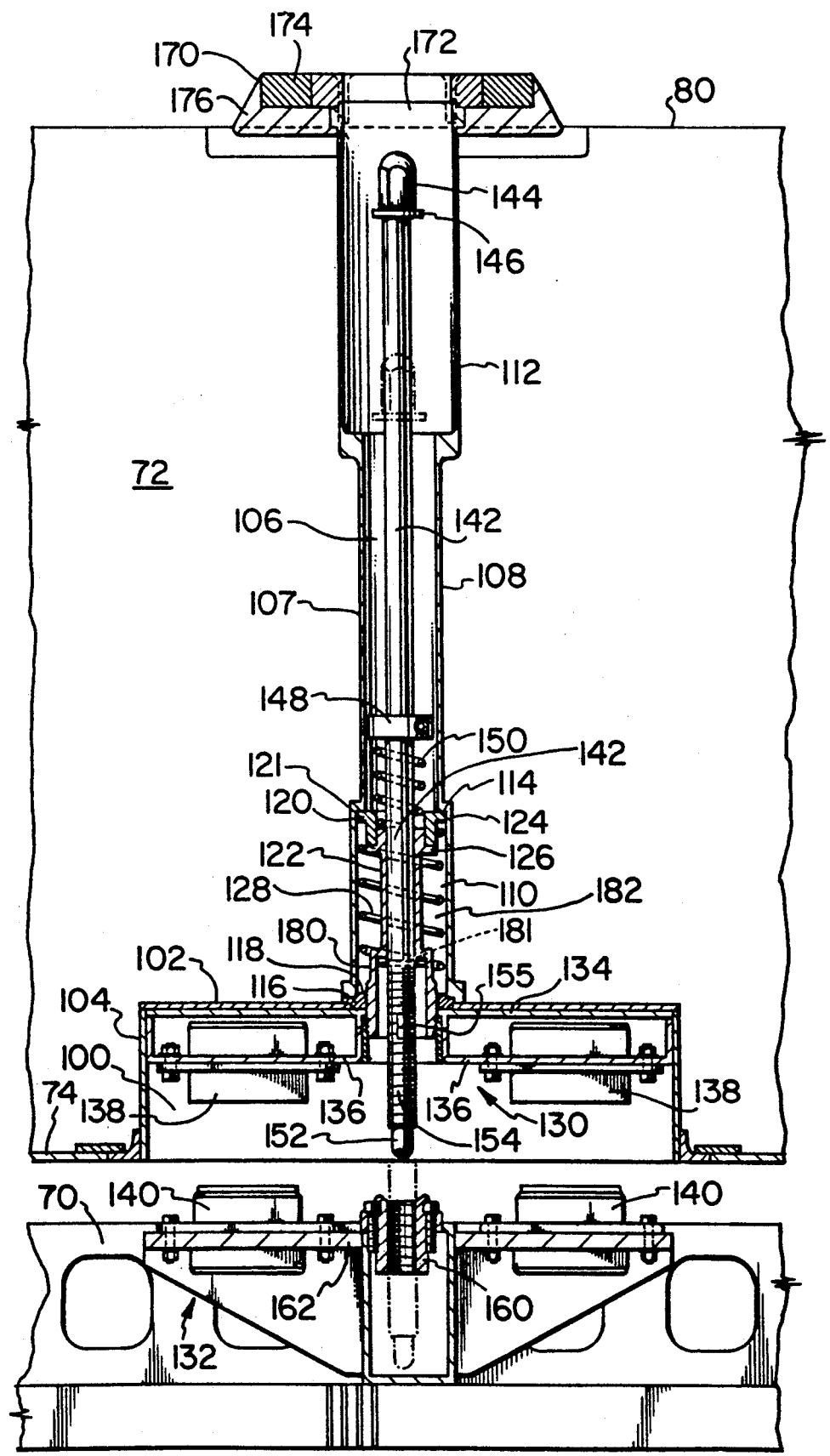
FIG. 6 is an enlarged detail of the mechanism that connects the ORU to the supporting structure.

The mechanism for attaching the orbital replacement unit to the support structure is illustrated in FIGS. 4, 5 and 6 of the drawings to which reference is now made.

As most clearly shown in FIG. 6 of the drawings, the housing 72 has a recess 100 formed in the bottom or back wall 74. The recess 100 has an inner wall 102 and side walls 104. A passage 106 extends through a tubular member 107 which is mounted in the housing 72. The passage 106 extends from the top or front wall 80 to the recess 100. The passage 106 has a central portion 108, an enlarged back end portion 110 and an enlarged front end portion 112. A first annular stop or shoulder 114 extends laterally between the lower end of the central portion 108 and the upper end of the back end portion 110. A spring retaining ring 116 is attached to the back end of the enlarged back end portion 110 and is formed with an end face 118 which forms a second shoulder and extends laterally inwardly of the portion 110 and is disposed opposite the first shoulder 114.

A flange or first collar 120 is slidably mounted in the enlarged portion 110 for movement between a first position bearing against the first shoulder 114 and a second position space from the first position toward the back wall 74 of the housing. A sleeve 122 is located in the enlarged portion 110 and has a front end 124 which fits in a close-fitting relationship within the first collar 120 and has a shoulder 126 that bears against the back end of the collar 120. A compression spring 128 has an upper end that bears against the flange 121 of the collar 120 and a lower end that bears against the second shoulder 118. The compression spring 128 normally urges the first collar 120 and the sleeve 122 to the first position which is shown in FIG. 6 of the drawings.

A connector support which is generally identified by the reference numeral 130 is mounted on the lower end of the sleeve 122. The connector support includes a base panel 134 slidably mounted for downward movement in the recess 100 but held against rotation therein, and bridges 136 on which a plurality of connectors 138 are mounted. The connector support 130 is mounted on the sleeve 122 for movement therewith from the retracted position shown in FIG. 6 to an extended position (not shown) in which the connectors 138 project outwardly from the recess 100 and mate with connectors 140 of a connector support assembly which is carried by the support 70.

A shaft 142 is mounted in the passage 106 for longitudinal movement therealong in sliding engagement with the connector support 130. The shaft has a hexagonal-shaped upper end portion 144 which terminates at a shoulder 146. The hexagonal-end portion 144 forms a suitable connection for attachment to a power tool of an end effector fitted with a corresponding socket. A second collar 148 is mounted on the shaft 142 and is located in the central portion 108 of the passage 106. The second collar 148 is clamped to the shaft 142 and a compression spring 150 extends from the collar 148 to the front end 124 of the sleeve 122. The compression spring 150 normally urges the shaft 142 to its retracted position which is shown in FIG. 6. The shaft 142 has a rounded nub 152 of reduced diameter at the back end thereof and a threaded portion 154 that extends from the nub 152. A thread locking plastic insert 155 is located on the threaded portion 154.

A threaded nut 160 is mounted in a platform 162 which is supported by the support structure 70. The connectors 140 are mounted on the platform 162.

An H-shaped interface 170 is mounted on the front wall 80 and has a passage 172 that extends therethrough which is aligned with the passage 106. H-shaped interfaces are well known and as a result, the structure will not be described in detail. The interface 170 includes an H-shaped bridge plate 174 mounted on legs 176 which serve to space it from the front wall 80 to permit a fixture to grasp the H-shaped interface as described in co-pending U.S. Pat. No. 5,120,243, dated Jun. 9, 1992.

In use after the orbital replacement unit has been aligned and docked using the alignment lever system previously described, the shaft 142 will be axially aligned with the nut 160. By using a tool such as a powered screwdriver which has a socket to accommodate the hexagonal-shaped upper end 144 of the shaft, it is possible to displace the shaft axially so that the spring 150 is compressed until the collar 148 is brought into contact with the collar 120. At this point the nub 152 has entered and is aligned with the nut 160. Rotation of the shaft 142 then moves the sleeve 122 and the connector support 130 axially forward toward engagement of the connectors 138 with the connectors 140. This movement is caused by screw threaded engagement between the screw threaded portion 154 and the nut 160 and causes the spring 128 to be compressed by the collar 120 so that a compression force or preload is applied by the spring 128 to the connector support 130 which ensures accurate seating of the connector support 130 on the connector support assembly 132. This causes accurate alignment of the connectors 138 with the connectors 140 prior to engagement therewith.

Further rotation of the shaft 142 causes further screw threaded engagement between the screw threaded portion 154 and the nut 160 which electrically connects the connectors 138 with the connectors 140.

From the foregoing, it will be apparent that the attachment mechanism used for attaching the orbital replacement unit makes provision for the correct and accurate alignment of the various connectors before the connectors are driven into mating engagement with one another.

In order to separate the orbital replacement unit 62 from the base 70, the head 144 of the shaft 142 is again accessed through the opening 172 of the interface 170 and is rotably driven in the direction required to cause the shaft to begin to move axially toward its retracted position and begin to unscrew the screw threaded portion from threaded engagement with the nut 160. This initially causes the connectors 138 to become disengaged from the connectors 140. Continued rotation of the shaft 142 removes the preload applied by the spring 128 and disengages the screw threaded portion from threaded engagement with the nut 160. Thereafter, the continued axial movement of the shaft 140 will cause the spring 150 to extend to its relaxed configuration.

From time to time, difficulty is experienced in attempting to separate connectors such as the connectors 138 and 140 from their mated position. To solve this problem, releasing collar 180 is provided which is mounted on the shaft 142 by means of a pin 181. The collar 180 is located in a recess 182 that is formed at the back end of the sleeve 122. If during the movement of the shaft 142 to its retracted position, the spring 128 does not exert sufficient force to cause the connectors 138 to withdraw from the connectors 140, the collar 180 will move into contact with the end wall of the recess 182 of the sleeve and continued axial movement will cause the shaft 142 to positively displace the sleeve 122 to forcefully extract the connectors 138 from the connectors 140.

Figure 7:
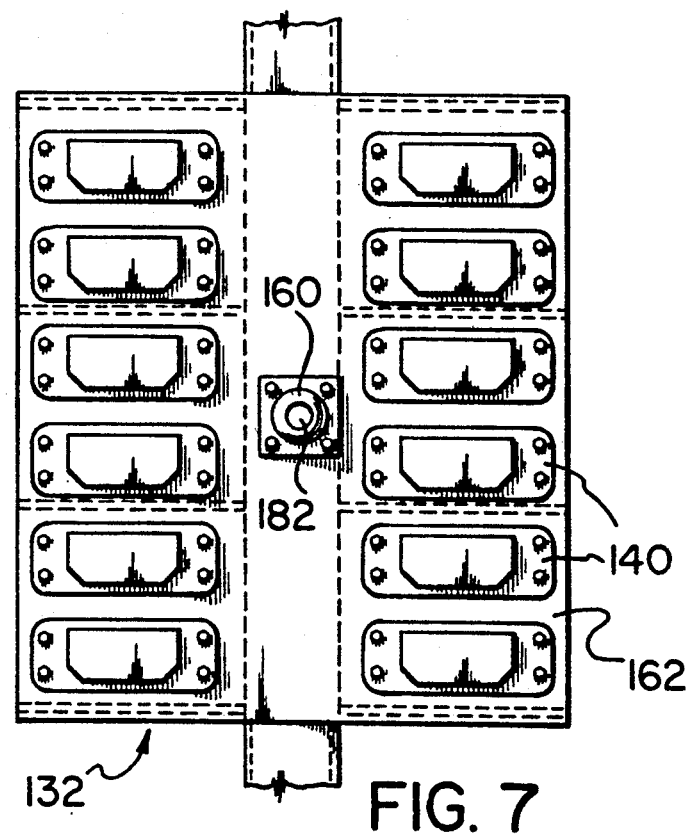
FIG. 7 is a plan view of the connector assembly of the orbiter taken along the line A—A of FIG. 4.
Figure 8:
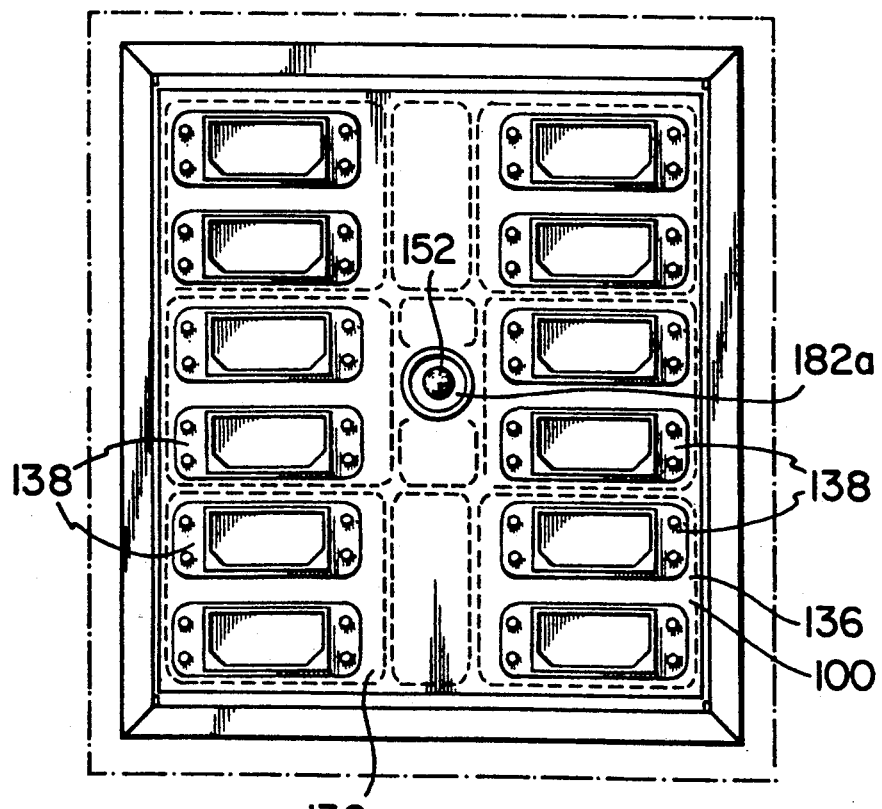
FIG. 8 is a plan view of the connector assembly of the orbital replacement unit taken along the line B—B of FIG. 4.

As shown in FIG. 7, the connector assembly 132 has a plurality of connectors 140 mounted thereon in a predetermined fixed relationship with respect to the access 182 of the threaded nut 160. Similarly, as shown in FIG. 8, the connector assembly 130 has a plurality of connectors 138 which are located in a predetermined fixed relationship with respect to the access 182 of the shaft 152.

From the foregoing, it will be apparent that the present invention provides a simple and effective alignment lever system for receiving and aligning a load item with respect to a target.

It will also be apparent that the present invention provides a simple and effective mechanism for releasably attaching an ORU to a target site including a mechanism that will ensure that the connectors that are carried by the ORU will mate effectively with the connectors that are carried by the support structure.

I claim:

1. A threaded bore engaging, orbital replacement unit, electrical connector assembly, for mating with a docking station connector, comprising:
    a) a base panel,
    b) at least one orbital replacement unit electrical connector mounted on the base panel,
    c) an open bottomed, base panel housing having the base panel held therein against relative rotation but slidable therein downwardly from an upper portion of the housing interior for bringing the said at least one electrical connector into electrically conductive engagement with at least one electrical connector of the corresponding docking station,
    d) means for mounting the housing in an opening in a rear wall of an orbital replacement unit casing with the open bottom of the housing exposed for the said engagement of the electrical connectors,
    e) a tube attached at one end to the housing and at the other end to a front face of the casing to form an open ended passage extending through the casing to the base panel,
    f) a shaft mounted in the tube for relative longitudinal and rotational movement therebetween, the shaft extending through the base panel for relative rotation and longitudinal movement therebetween, the shaft terminating beyond the base panel with a leading screw threaded end for mating with the threaded bore of the docking station connector, and
    g) spring loading means spring loading the shaft to a retracted position and holding the base panel in the upper portion of the housing interior, whereby, with a corresponding docking station connectors positioned beneath the housing,
        i) the spring loading means will, when the shaft and base panel are moved forwardly for the leading end of the shaft to meet and be aligned with the threaded bore of the docking station connector, apply an initial disconnecting force urging the shaft and the base panel towards the retracted position, and then
        ii) rotational movement of the shaft will then cause threaded engagement between the screw threaded end of the shaft and the threaded bore of the docking station connector at which stage the spring loading means will apply a preload for accurate alignment of the electrical connectors of the connector assembly and the docking station, and then
        iii) further rotation of the shaft causes further threaded engagement between the screw threaded end of the shaft and the nut which brings the aligned electrical connectors into electrical connection.

2. A connector according to claim 1, wherein the screw threaded leading end of the shaft terminates with a rounded nub for guiding the leading end of the shaft into the threaded bore of the docking station connector.

3. A connector according to claim 1, further comprising a releasing collar on the shaft for engagement with the base panel for positive displacement of the mated connectors during disconnection.

4. A connector assembly according to claim 1, further comprising a second annular stop attached to the inside of the tube and extending around the shaft, a flanged sleeve is slidably mounted around the shaft in a leading portion of the tube with the flange for abutment with the annular stop, the base panel is attached to a leading end of the flanged sleeve, a spring retaining ring is attached to the tube leading end and is around the shaft, a retaining ring is attached to the tube leading end and is around the shaft, a compression spring, for applying the disconnecting load is compressed between the sleeve flange and the spring retaining ring, a shaft collar is attached to extend around a portion of the shaft rearwardly of the annular stop, and a compression spring for applying the preload is compressed between the annular stop and the shaft collar to hold the sleeve flange against the annular stop.

* * * * *